INVENTOR.
GEORGE BANKO

June 19, 1962 G. BANKO 3,039,239
LINEAR OPTICAL COMPARATOR FOR AN OPERATING MACHINE TOOL
Filed June 15, 1960 5 Sheets-Sheet 2

INVENTOR.
GEORGE BANKO
BY
Sanford Schnurmacher
ATTORNEY.

June 19, 1962 G. BANKO 3,039,239
LINEAR OPTICAL COMPARATOR FOR AN OPERATING MACHINE TOOL
Filed June 15, 1960 5 Sheets-Sheet 3
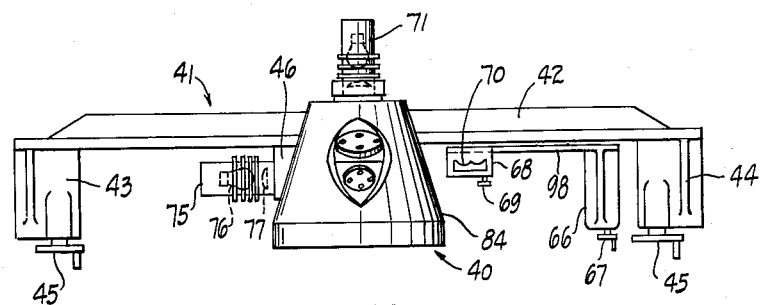
Fig. 3
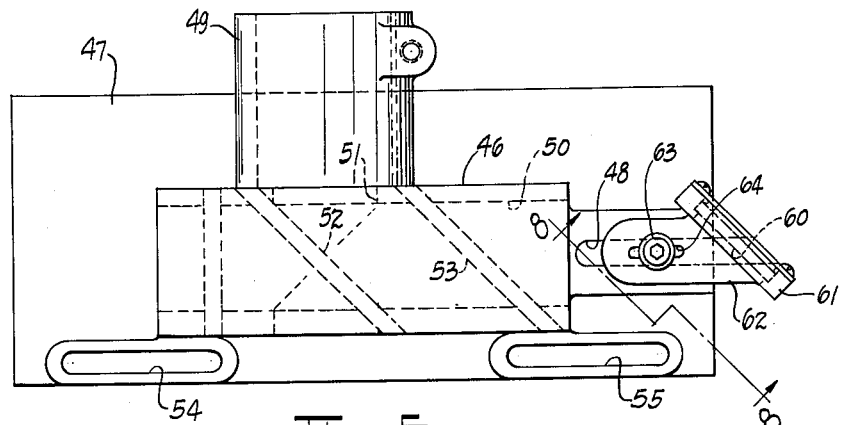
Fig. 6
Fig. 7
Fig. 8
INVENTOR.
GEORGE BANKO
BY
Sanford Schnurmacher
ATTORNEY.

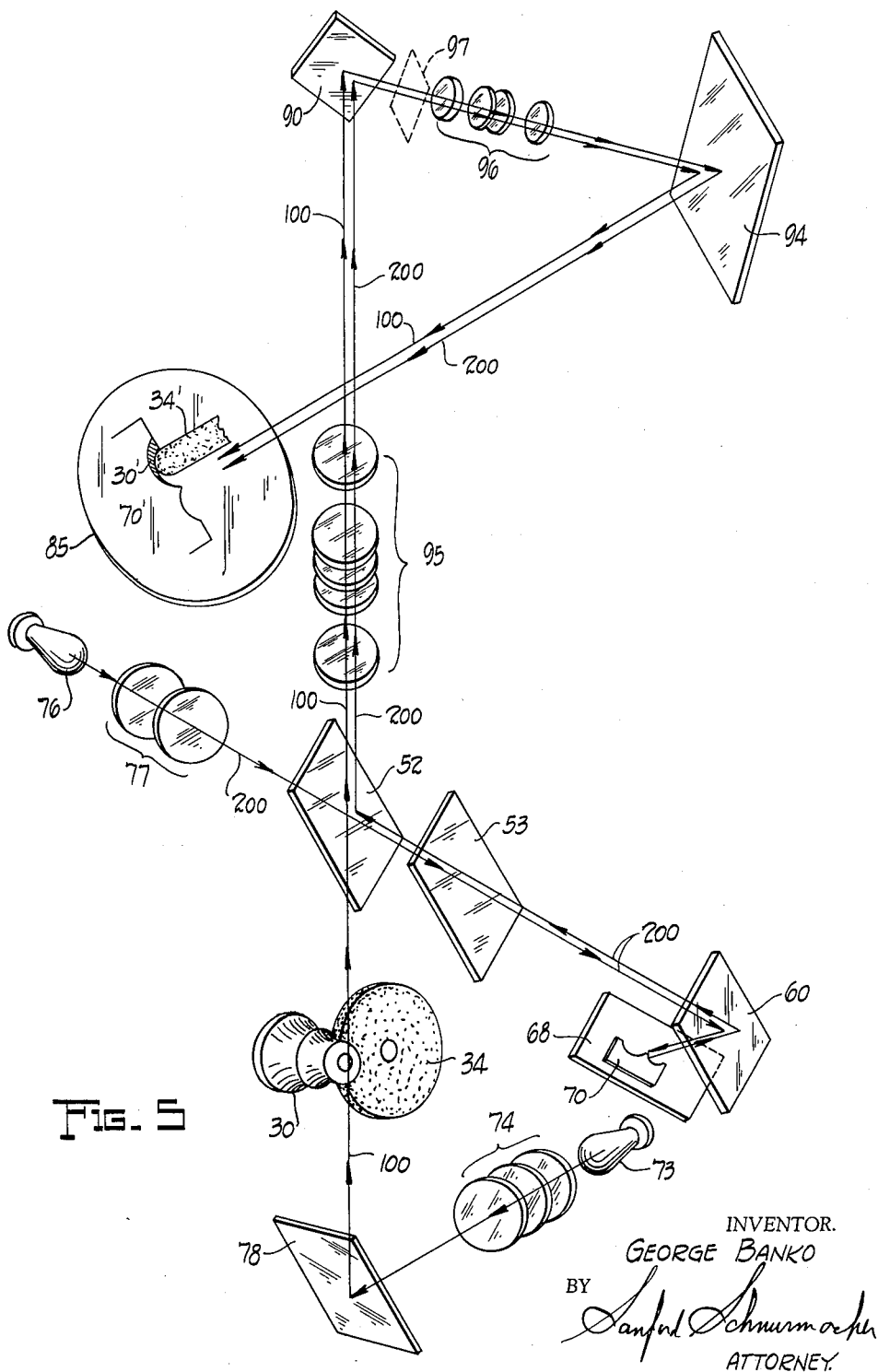

United States Patent Office
3,039,239
Patented June 19, 1962

3,039,239
LINEAR OPTICAL COMPARATOR FOR AN OPERATING MACHINE TOOL
George Banko, 1834 E. 223rd St., Euclid, Ohio
Filed June 15, 1960, Ser. No. 36,383
4 Claims. (Cl. 51—165)

This invention relates to optical comparators and particularly to a linear viewer for an operating cylindrical grinding machine.

Conducive to a better understanding of the invention it may be well to point out that one of the major shortcomings of all optical viewers, including inspection comparators, is that the screen size, that is the length and width or diameter of the screen, is insufficient to completely cover the workpiece at a reasonable magnification (10×) necessary for the precision requirements of the finished product. This is because the physical dimensions and cost of an instrument large enough to cover a workpiece of substantial size is prohibitive.

The primary object of this invention, therefore, is to provide means for the linear viewing of a comparing media in juxtaposition with the workpiece.

Another object is to provide a device of the type stated having an optical viewing system that can be moved to cover the full area of a large workpiece and still have the image of the comparing media appear upon a relatively small screen in juxtaposition with the shadow or image of the workpiece, without need for using expensive slides, micrometers, gage blocks, and the like.

A further object is to provide an inspection viewer for an operational cylindrical grinding machine which simultaneously projects, in superposed relationship onto a viewing screen, the images of the workpiece as it is being shaped by the grinder and the outline of a reference specimen or replica, at a scale 1:1 with reference to the workpiece; said projected images being formed directly through a same and single objective lens that is movable linearly of the workpiece and reference specimen to simultaneously scan the length thereof.

These and other objects of the invention will become apparent from a reading of the following specification and claims, together with the accompanying drawings in which like parts are referred to and indicated by like reference numerals, and wherein:

FIGURE 3 is a top plan view of the viewer with the reference specimen mirror broken away;

FIGURE 5 is a schematic layout of the optical system;

FIGURE 6 is a front view of the unmounted objective lens locator bracket;

FIGURE 7 is a right end view of the same; and

FIGURE 8 is a front view of the reference specimen illuminating and reflecting mirror.

Figure 1:
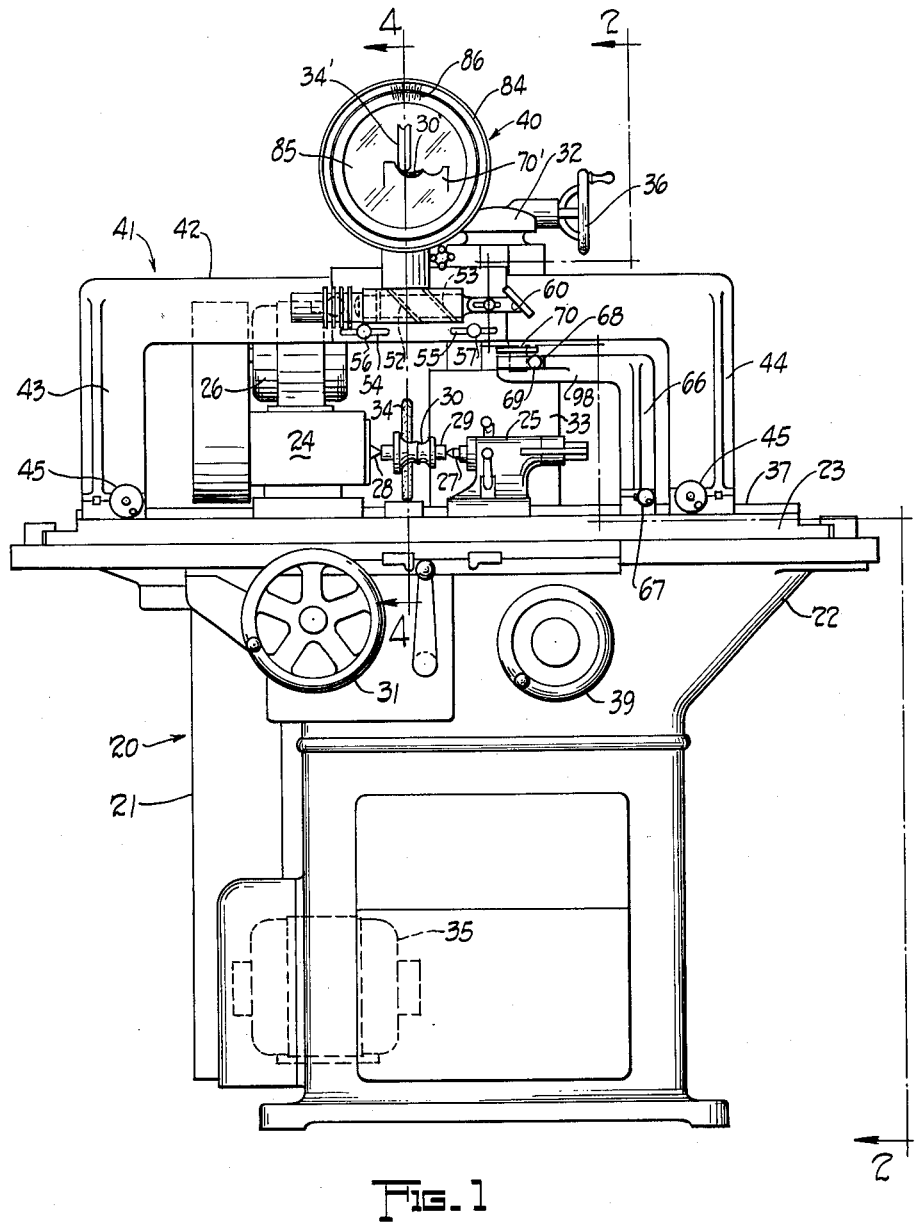
FIGURE 1 is a front elevational view of the linear optical viewer that is the subject of this invention, mounted on a conventional cylindrical grinding machine.
Figure 2:
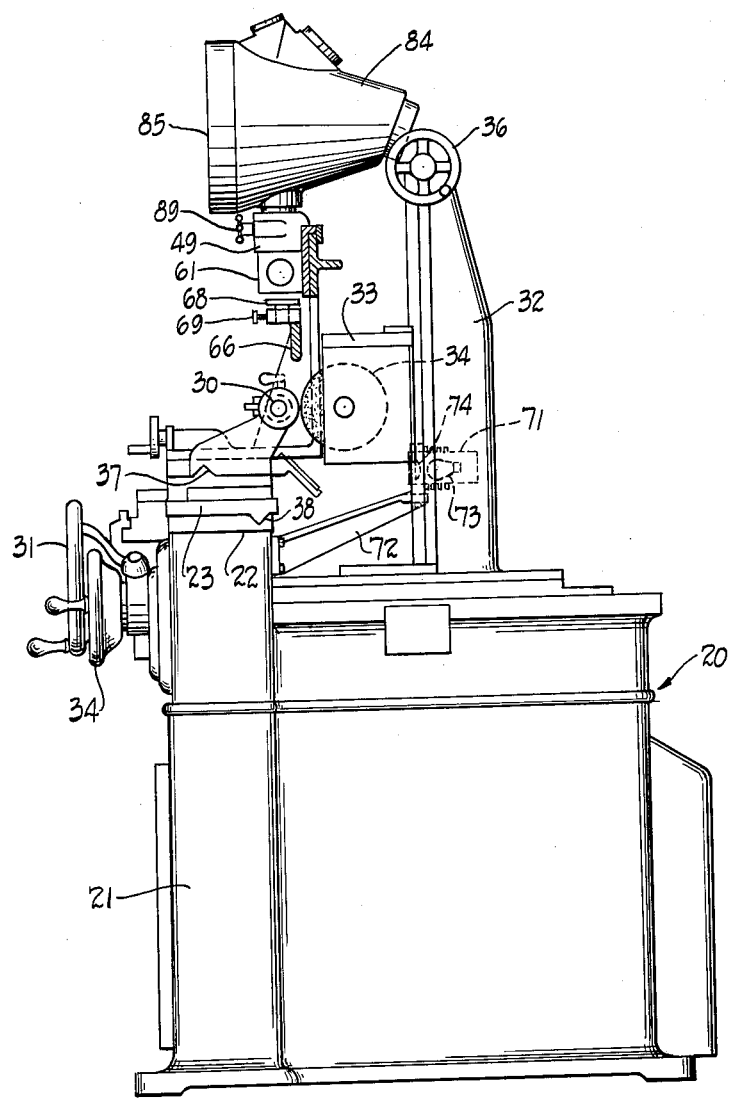
FIGURE 2 is a right end view of the same, with portions broken away and in section, taken along the line and in the direction of the arrows 2—2 of FIGURE 1.

Referring more particularly to the drawings, the instant invention consists of the combination of an operational cylindrical grinding machine, broadly indicated by reference numeral 20, with an optical viewer, broadly indicated by reference numeral 40, mounted on the table 23 thereof, as seen in FIGURES 1 and 2.

The structure, indicated by reference numeral 20, used for the purpose of illustration if FIGURES 1 and 2, is a conventional cylindrical grinding machine having a base 21 and a bed 22 upon which a sliding table 23 is supported on flat and V-ways 38.

Reference numerals 24 and 25 indicate head and foot stocks, respectively, mounted on the table 23 on flat and V-ways 37. The headstock spindle is driven by a motor 26, and the workpiece 30, to be shaped, is mounted on an arbor 29, held between centers 27 and 28.

Reference numerals 31 and 39 indicate hand wheels which control the table longitudinal and cross feeds.

Reference numeral 32 indicates the upright post which carries the vertical movable slide 33 on which the grinding wheel 34 is mounted.

Both the grinding wheel and the table 23 are driven by the motor 35, through suitably arranged belts and gearing, as is well known by those skilled in the art.

The grinding slide 33 is adjustable vertically of the post 32 by means of the handle wheel 36.

The viewer 40 has a substantially V-shaped supporting frame, broadly indicated by reference numeral 41, mounted on the table 23.

The frame 41 has a central horizontal rail 42 extending above and clear of the area between the head and foot stock centers 27 and 28, and the working edge of the grinding wheel 34, which is supported between two uprights 43 and 44, as is seen most clearly in FIGURE 1.

The entire frame 41 is slidably mounted across the V-ways 37 of the table 23, and can be locked in adjusted positions longitudinally of the table by means of T-slot bolts. Reference numeral 45 indicates a hand wheel at the base of each upright 43 and 44 which controls crossfeed mechanism whereby the entire frame 41 can be moved laterally of table 23.

Figure 4:
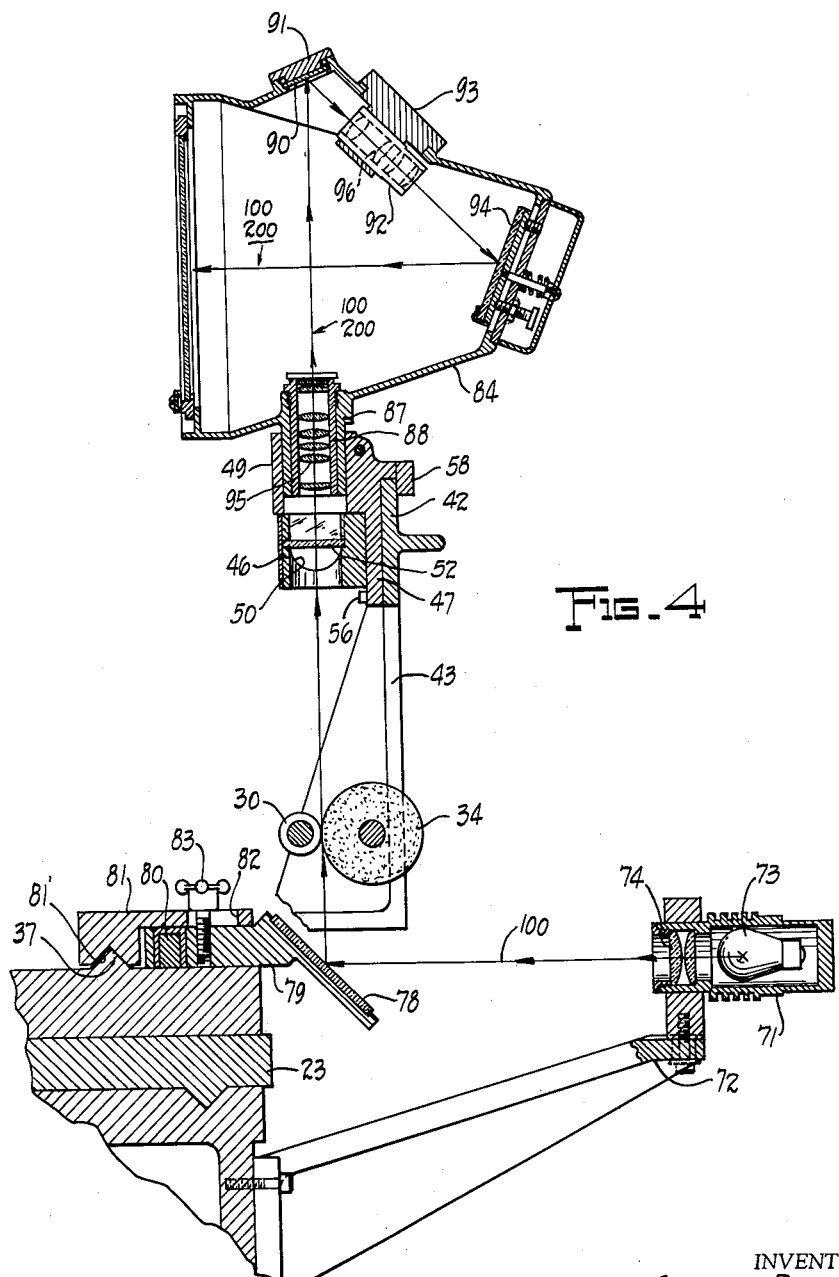
FIGURE 4 is a vertical sectional view taken along the line and in the direction of the arrows 4—4 of FIGURE 1.

Reference numeral 47 indicates the optical system bracket locator plate which is slidably mounted on the frame rail 42 by means of a hanger 58 which hooks over the top edge of the rail 42 and is in sliding contact with the rear face thereof, as is seen most clearly in FIGURES 4 and 7.

The plate 47 has two elongated slots 54 and 55 in the lower edge thereof. Two headed lock bolts 56 and 57 are mounted through the slots 54 and 55, respectively, and anchored in threaded holes in rail 42, as is seen most clearly in FIGURE 1.

The locator plate 47 can be moved longitudinally of the rail 42 within the limits set by the slots and may be locked in adjusted positions by drawing up the bolts 56 and 57.

Reference numeral 49 indicates a split collar mounted on the locator plate 47 and adapted to receive and hold the mounting sleeve 87 of hereinafter described screen housing 84.

A beam splitter mounting case is mounted on the face of the plate 47 by means of bolts 59. The beam splitter case 46 has a vertical opening 51 therethrough, which is aligned with the opening of the screen housing sleeve 87, and a horizontal passageway 50 therethrough, which is intersected by the vertical passage 51.

The screen housing 84 comprises a light-tight metal box mounted on the locator plate collar 49 through a sleeve 87. An objective lens 95, made up of suitable optical components to provide the required magnification of the workpiece and specimen images, is mounted in a lens sleeve 88 slidably mounted in turn in the housing sleeve 87, and focused by means of a gear wheel 89.

As seen most clearly in FIGURE 4, a mirror 90 mounted within the housing 84, at the top thereof, is aligned with the optical axis of the objective lens 95, at an angle thereto such that it will reflect a beam from the objective lens through a projection lens systems 96 also mounted within the housing in a focusing sleeve 92. Another mirror 94 reflects light received from the projector lens 96 on to the translucent screen 85. The mirror 94 has means for centering and leveling the images projected on to the screen 85. The mirror 90 and projector lens 96 can be reached for adjustment by removing covers 91 and 93, respectively.

Reference numeral 86 indicates an angular inclination scale engraved on the screen and housing rims to indicate the inclination of base or other dimensional lines, if such should be engraved on the face of the screen.

A beam splitter plate 52 is located within the passageway 50 of the case 46 at its intersection with the vertical passageway 51 thereof, and in line with, and at an angle of 45° to the optical axis of the objective lens 95, with its reflective surface faced toward the objective lens, at is seen most clearly in FIGURES 5 and 6.

The beam splitter 52 may be of various types, either ¼ wave layers of material upon a sheet of glass, or a piece of glass with 50% transparency and 50% reflection, or a suitable ratio thereof, or may even take the form of a beam splitter prism, in which case the correcting plate 53 would not be needed. In the structure illustrated, a sheet of glass having a mirrored surface of 50% transparency and 50% reflective power is used.

A lamp housing 75 is mounted at the left end of the mounting case passageway 50, as is seen in FIGURES 1 and 3. The housing 75 contains an electric lamp 76 and beam collimating condenser lens 77.

A reference specimen light reflecting mirror 60 is mounted on the locator plate 47, spaced from and opposite the right end of the beam splitter case passageway 50. The mirror 60 is aligned with the optical axis of the light beam condenser lens 77, and is inclined at an angle of 45° thereto.

The mirror 60 is mounted in a frame 61, which is in turn slidably engaged with a slot 48 in the plate 47 and is freely movable in a horizontal plane between adjusted positions relative to the beam splitter plate 52. The frame 61 is locked in place by means of a bolt 63, as is seen most clearly in FIGURE 6.

A workpiece illuminating mirror 78 is mounted on the table 23, below the workpiece and grinding wheel, on the optical axis of the objective lens 95 and at an angle of 45° thereto, as is seen most clearly in FIGURE 4.

The mirror 78 is mounted in a holder made up of two slidably interconnected sections 79 and 81, joined through a lock bolt 83, anchored in section 79 and passing through a slot 82 in section 81. Section 79 has one or more permanent magnets 80 embedded in the bottom face thereof which acts to anchor the mirror holder at any desired position on the table 23. A V-slot 81' along the rear edge of section 81 engages the table V-way 37 and aids in positioning the held mirror 78 square with the table and workpiece. The mirror 78 can be moved laterally of the table by loosening the bolt, and held in adjusted positions by relocking the bolt.

A workpiece illuminating lamp 73 is mounted in a housing 71. The housing 71 is supported by a bracket 72 which is mounted on the machine base 22 below the table 23.

The housing 71 is so positioned that the light beam 100 from the lamp 71 will be aligned with the grinding wheel and will intersect the optical axis of the objective lens 95 below the grinding wheel at the mirror 78. Reference numeral 74 indicates a light beam collimating condenser lens.

Reference numeral 66 indicates a bracket arm which supports the reference specimen platform 68. The bracket 66 is mounted directly on the machine table 23, entirely independent of the frame 41. Bracket 66 is fully adjustable as to movement, both longitudinal and cross-wise of the table 23. Cross-feed is effected in the usual manner by means of a control wheel 67.

The platform 68 is positioned immediately below the specimen mirror 60, as seen most clearly in FIGURES 1 and 2. The platform is adjustable in a vertical plane by means of control knob 69.

As stated hereinbefore, the primary purpose of this invention is to enable the operator of a cylindrical grinding machine to view the superposed image of a workpiece, as it is being shaped, and the outline of a reference specimen at a 1:1 scale, while simultaneoously grinding the workpiece toward the contour of the reference specimen.

In order to more easily explain how this is brought about, reference is made to FIGURE 5, wherein the schematic layout of the optical system is displayed without its supporting physical structure.

The focal lengths and diameters of the various lens components may vary, depending upon the size of the final image desired and the working distances between the various elements.

This data can be easily computed by one skilled in the art, and therefore no detailed optical specifications will be given here.

Two beams of light are involved. The first, broadly indicated by reference numeral 100, carries the workpiece and grinding wheel images, while the second, broadly indicated by reference numeral 200, carries the reference specimen image.

Beam 100 originates at the lamp 73, travels horizontally through collimating condenser lens 74 on to the mirror 78. At this point it is reflected 90° vertically to illuminate the area of contact between the workpiece 30 and the grinding wheel 34. The beam 100, now carrying the shadow outline of the workpiece and grinding wheel, then passes upward through the beam splitter plate 52, which in this particular phase of the system serves no purpose, and through the objective lens 95. The beam 100 is then reflected from the mirror 90 to form a real shadow image, in the air, of the workpiece and grinding wheel, at the point 97, as indicated by a dotted line square. The projector lens 96 is focused on the image 97 which it enlarges and projects onto the mirror 94, which in turn reflects it upon the translucent screen 85 where it appears as an enlarged shadow image of the workpiece and grinding wheel, identified by reference numerals 30' and 34', respectively.

The second beam 200, originates at lamp 76, travels through collimating condenser lenses 77, the beam splitter and correcting plates 52 and 53, which have no function in this phase of the system, and on to the mirror 60 from which it is reflected down upon the face of the reference specimen 70, supported on the platform 68.

The reference specimen 70 is generally a template made exactly to a 1:1 ratio to the workpiece 30, or may be a cross-sectional portion or remaining portion of a previous workpiece that is to be duplicated.

Beam 200 then reverses its direction of travel as it is reflected back upon itself after it strikes the surface of the reference specimen 70. Beam 200, now carrying the colored image of the specimen 70, is reflected from the mirror 60, through the correcting plate 53. The correction plate 53 is made of clear glass of the same chemical formula, thickness and angular inclination as the beam splitter mirror 52, and is placed in the system to make certain that the thickness and type of glass through which the image bearing sections of beams 100 and 200 pass is identical. After passing through the correcting plate 53, the beam 200 is reflected upward by the beam splitter 52, which has its reflecting side faced toward both the mirror 60 and the objective lens 95. From this point onward, beam 200 follows the identical path as that of beam 100, through the balance of the optical system. A real image of the reference specimen is formed in the air in superposed position on the workpiece and grinding wheel images, at 97. The combined images of beams 100 and 200 then pass through the projector lens 96, and are reflected by mirror 94 onto the viewing screen 85. The enlarged image of the reference specimen, identified by reference numeral 70', appears upon the screen superposed upon the shadow images of the workpiece 30' and grinding wheel 34'.

Since the image of the specimen 70' is projected in full color upon the shadow 30' of the workpiece, any portion of the workpiece that is larger than the reference specimen will stand out against the bright outline of the reference image 70'. The black shadow of the unformed portion of the workpiece indicates how much, and where, material remains to be removed.

In setting up the machine for continuous visual inspection, the workpiece 30 is mounted on an arbor 29 held between the centers 27 and 28, as seen in FIGURE 1. The table 23 is then moved to bring the workpiece opposite the grinding wheel 34 at the point where the first cut is to be made, usually at one end of the workpiece. In the set-up illustrated, the grinding is started at the left end of the workpiece 30. Thereafter, as progressive cuts are taken, the table 23 and workpiece 30 will be moved toward the left. The locator plate 47 is positioned on the frame rail 42 with the right end of the slots 54 and 55 against the lock bolts 56 and 57. This will provide maximum adjustment of the locator plate 47 toward the right of its original location.

The frame 41 is then moved longitudinally of the table 23 to bring the optical axis of the objective lens 95 in line with the vertical center line of the grinding face of the wheel 34, and then locked in place. The frame 41 is then moved laterally of the table 23 by means of the cross-feed controls 45 to line up the axis of the objective 95 with the point of contact between the workpiece 30 and the grinding wheel 34, as seen in FIGURE 4.

The mirror 78 is then positioned on the table below the workpiece so that it will reflect the light beam 100, coming from the lamp 73, upward it will illuminate the workpiece 30 and grinding wheel 34 in the line of the optical center of the objective lens 95. The objective lens is then focused to produce a sharp shadow image of the workpiece 30' and grinding wheel 34' on the viewing screen 85.

A reference specimen 70 at a scale of 1:1 to a workpiece having the desired contour, is positioned on the platform 68, as is seen most clearly in FIGURE 3. The bracket 66 is then adjusted longitudinally and cross-wise of the table 23 to bring the specimen below the mirror 60, as seen in FIGURE 1, in line with the optical axis of the beam 200 coming from the lamp 76. The mirror 60 and the bracket 66 are adjusted so that the distance from the specimen 70 to the optical center of the objective lens 95 is substantially equal to the distance from the workpiece to the same point. Thus both images 30' and 70' are formed through the same and single objective 95. The platform 68 is adjustable vertically by means of knob 69, through a distance of approximately ½", to provide fine adjustment, for focusing the specimen 70.

The superposed images of the workpiece 30' and reference specimen 70' appear on the viewing screen 85, together with the grinding wheel image 34' as seen in FIGURES 1 and 5, in approximately 10× enlargement, or in whatever other magnification power considered suitable.

After the viewed section of the workpiece is ground to the reference contour, a new section may be easily brought into view by moving the grinder table 23 to the left until a new area of the workpiece is positioned opposite the wheel 34. This will move the optical center of the objective lens 95 to the left of the grinding wheel 34 since everything supported on the table 23 will move simultaneously to the left.

The locator plate bolts 56 and 57 are then loosened and the locator plate is slid to the right until the optical axis of the objective lens 95 is re-aligned with the operational area. The mirror 78 is then relocated opposite the lamp 73. At the same time the mirror 60 will also move to the right the same distance relative to the specimen 70, which is held in juxtaposition to the workpiece 30 on the bracket platform 68. This brings a new section of the reference specimen into view, corresponding to the new section of the workpiece 30. If the workpiece is extremely long, it may be necessary to move the whole frame 41 to bring the end portions of the workpiece and reference specimen into view.

It should be noted, however, that the bracket 66 is not moved relative to the workpiece 30 at any time, so that the reference specimen 70 and the workpiece 30 are always in fixed juxtaposition no matter how far the objective lens 95 has to be moved longitudinally of the table 23 to cover successive sections of the workpiece and reference specimen. Furthermore, the superposed images of the workpiece and reference specimen always remain at the same magnification and in sharp focus, since the same relative focal distances are maintained no matter what the new position of the viewer lens 95 may be with reference to the workpiece.

Thus, with this structure a relatively small viewing screen 85 may be used to view successive sections of a large workpiece and its related reference specimen.

In the illumination system described, a collimated beam of light is called for since it provides the most accurate image. However, a converging or diverging beam could provide acceptable results. There is also a hybrid beam of light that could be collimated in the vertical or horizontal sense only, while normal to the collimated direction, it could be converging or diverging and still produce adequate results.

Colored light might also be used to produce striking contrasts on the viewing screen.

While the viewer described is shown in connection with circular workpiece, articles of a flat nature could also be produced if the machine has a reciprocating grinding wheel. It could also be used with lathes, since the workpiece rotates, and the resulting workpiece configuration would show up well on the viewing screen.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In combination with a cylindrical grinding machine of the type having a table, a grinding wheel, and workpiece holding and rotating centers positioned on the table at the grinding wheel, an optical comparator, comprising, a frame member mounted on the table, including a rail portion extending horizontally above the workpiece holding centers; a platform mounted on the table adapted to support a reference specimen in fixed juxtaposition relative to a held workpiece; a light-tight housing slidably mounted on the rail; an objective lens mounted vertically through the bottom of said housing, faced toward the workpiece; the housing having a viewing screen in its front wall and an image projecting system, optically aligned with the objective lens, disposed therein between the objective lens and the viewing screen; and a beam splitter mirror mounted below the objective lens, at an inclination of 45° to the optical axis thereof, with its reflecting upper surface faced toward both the objective lens and the reference specimen, and its non-reflecting lower surface faced toward the workpiece; the focal length of the objective being such that it will form superposed real aerial images of the reference specimen and workpiece within the housing in the focal plane of the projector lens; the housing being movable longitudinally of the rail to simultaneously focus the objective lens on linearly related portions of the workpiece and reference specimen.

2. A machine as described in claim 1 and further distinguished by having, a clear glass correction plate; of the same chemical formula, thickness, and angular inclination as the beam splitter mirror; spaced from the beam splitter mirror, and positioned between the reflecting surface thereof and the reference specimen; whereby the images of the workpiece and reference specimen entering the objective lens will pass through equal glass thicknesses.

3. An optical comparator, comprising in combination, a table having a workpiece holding fixture; a frame member mounted on the table, including a rail portion extending horizontally above the workpiece holding fixture; a platform mounted on the table adapted to support a reference specimen in fixed juxtaposition relative to a held workpiece; a light-tight housing slidably mounted on the rail; an objective lens mounted vertically through the bottom of said housing, faced toward the workpiece; the housing having a viewing screen in its front wall and an image projecting system, optically aligned with the objective lens, disposed therein between the objective lens and the viewing screen; and a beam splitter mirror mounted below the objective lens, at an inclination of 45° to the optical axis thereof, with its reflecting upper surface faced toward both the objective lens and the reference specimen, and its non-reflecting lower surface faced toward the workpiece; the focal length of the objective being such that it will form superposed real aerial images of the reference specimen and workpiece within the housing in the focal plane of the projector lens; the housing being movable longitudinally of the rail to simultaneously focus the objective lens on linearly related portions of the workpiece and reference specimen.

4. A machine as described in claim 3 and further distinguished by having a clear glass correction plate; of the same chemical formula, thickness, and angular inclination as the beam splitter mirror; spaced from the beam splitter mirror, and positioned between the reflecting surface thereof and the reference specimen; whereby the images of the workpiece and reference specimen entering the objective lens will pass through equal glass thicknesses.

References Cited in the file of this patent

UNITED STATES PATENTS

| | | |
|---|---|---|
| 2,485,355 | Brennan | Oct. 18, 1949 |
| 2,845,756 | Papke | Aug. 5, 1958 |